(12) United States Patent
Tian (10) Patent No.: US 10,263,872 B2
(45) Date of Patent: Apr. 16, 2019

(54) LONG CONNECTION SHARING METHOD FOR MULTI-BUSINESSES, SYSTEM AND DEVICE, TERMINAL

(71) Applicant: SHENZHEN SKYWORTH-RGB ELECTRONIC CO., LTD., Shenzhen (CN)

(72) Inventor: Jisheng Tian, Shenzhen (CN)

(*) Notice: Subject to any disclaimer, the term of this patent is extended or adjusted under 35 U.S.C. 154(b) by 89 days.

(21) Appl. No.: 15/414,627

(22) Filed: Jan. 25, 2017

(65) Prior Publication Data

US 2017/0134256 A1 May 11, 2017

Related U.S. Application Data

(63) Continuation of application No. PCT/CN2015/097955, filed on Dec. 18, 2015.

(30) Foreign Application Priority Data

Sep. 8, 2015 (CN) .......................... 2015 1 0567873

(51) Int. Cl.
*G06F 15/173* (2006.01)
*H04L 12/26* (2006.01)
(Continued)

(52) U.S. Cl.
CPC ............... *H04L 43/10* (2013.01); *H04L 43/04* (2013.01); *H04L 61/106* (2013.01); *H04L 67/26* (2013.01); *H04L 67/42* (2013.01)

(58) Field of Classification Search
USPC ................. 709/217, 218, 219, 223, 224, 227
See application file for complete search history.

(56) References Cited

U.S. PATENT DOCUMENTS

2005/0102312 A1* 5/2005 Ohya ................... G06F 21/6245
2008/0165796 A1* 7/2008 Martinez ............... H04L 43/103
370/458

(Continued)

FOREIGN PATENT DOCUMENTS

CN 103139303 A 6/2013
CN 103916442 A * 7/2014
(Continued)

OTHER PUBLICATIONS

PCT/CN2015/097955 International Search Report (dated May 27, 2016) (in Chinese).
OA of CN201510567873.5 (dated Jan. 9, 2018) (In Chinese).

*Primary Examiner* — Liang Che A Wang
(74) *Attorney, Agent, or Firm* — W&K IP (57) ABSTRACT

The present disclosure discloses a long connection sharing method for multi-businesses. The method includes the following steps: a client of the long connection establishes a channel, and obtains heartbeat time; the server of the long connection configures an unique business ID for each business, and sends the business ID to the client of the long connection; the client of the long connection transmits the business ID to a business client, and then the business client reports the business ID to a business server corresponding to the business client; after receiving business information, the server of the long connection sends the business information to the client of the long connection through the channel; and the client of the long connection pushes the business information to the business client. The present disclosure also discloses a long connection sharing system for multi-businesses, and a device and a terminal thereof.

11 Claims, 5 Drawing Sheets

(51) Int. Cl.
*H04L 29/12* (2006.01)
*H04L 29/08* (2006.01)
*H04L 29/06* (2006.01)

(56) References Cited

U.S. PATENT DOCUMENTS

| | | | |
|---|---|---|---|
| 2009/0119268 A1* | 5/2009 | Bandaru | G06F 17/2745 705/7.12 |
| 2009/0251283 A1* | 10/2009 | Ito | G07C 9/00111 340/5.61 |
| 2014/0278953 A1* | 9/2014 | Ismail | G06Q 30/0251 705/14.49 |
| 2015/0301875 A1* | 10/2015 | Harnesk | G06F 9/546 719/313 |
| 2016/0308748 A1* | 10/2016 | Zuo | H04L 43/103 |
| 2016/0337462 A1* | 11/2016 | Chen | H04L 67/36 |

FOREIGN PATENT DOCUMENTS

| | | |
|---|---|---|
| CN | 104144159 A | 11/2014 |
| WO | 2014121605 A1 | 8/2014 |

* cited by examiner

LONG CONNECTION SHARING METHOD FOR MULTI-BUSINESSES, SYSTEM AND DEVICE, TERMINAL

CROSS-REFERENCE TO RELATED APPLICATIONS

This application is a continuation of International Patent Application No. PCT/CN20151097955 with a filing date of Dec. 18, 2015, designating the United States, now pending, and further claims priority to Chinese Patent Application No. 201510567873.5 with a filing date of Sep. 8, 2015. The content of the aforementioned application, including any intervening amendments thereto, are incorporated herein by reference.

TECHNICAL FIELD

The present disclosure relates to the field of communication technologies, and in particular, to a long connection sharing system for multi-businesses, and a device a terminal.

BACKGROUND OF THE PRESENT INVENTION

Currently, most of the terminal device, such as, a mobile phone, a computer, a smart television, and so on, all use internal network IP of a network operator's gateway, such as, all use IPV4, not a separately public IP. In order to improve a utilization rate of addresses, network operator retrieves addresses which are unused for a long-term, and the retrieves are not to be noticed. So in an normal case, if a client in the terminal does not try to communicating with a server of the network operator, it is impossible to learn that a connection between the client in the terminal and the server of the network operator is retrieved.

With the development of the times, the clients of a variety of terminals unilaterally send requests of acquiring information to the server of the network operator in the unilateral end of services to network operators, it is not adequate to meet the needs that app of the terminal acquires information timely. For example, when a breaking news occurs, the server can pushes the news to a news app on the terminal to notice users, at this time, the server of the network operator should inform the client of the terminal, and it should be no longer limited to that the client unilaterally sends request to the server.

However, in order to realize that the client and the server can inform to each other in the current network situation, a long connection needs to be established. In the existed long connection projects, one business uses a long connection, such that the utilization rate of the long connection is low, most of the long connections are in idle state. As heartbeat time on the terminal cannot be aligned, which causes that the CPU is usually awakened, electric is highly consumed. And a heartbeat for maintaining the survive of the long connection should be regularly sent. As the terminals are many and varied, the network environments which the terminals are located are also different, some networks are good, and need a heartbeat in one hour, some networks may need a heartbeat in one minute. If the time of sending heartbeat is unified, the time of sending heartbeat must be a lowest value, otherwise many networks may not live.

SUMMARY OF PRESENT INVENTION

The present disclosure is to provide a long connection sharing method for multi-businesses, and a device, a terminal, which aims to achieve that multi-businesses can share a long connection channel, to improve the utilization rate of the long connection.

In order to realize the above aim, the present disclosure provides a long connection sharing method for multi-businesses, which includes the following steps:

establishing a channel for transmitting data to a server of the long connection by a client of a long connection, and acquiring a heartbeat time to maintain a survival of the long connection;

configuring an unique business ID to each business according to an application request of each business by the server of the long connection, and sending the business ID to the server of the long connection;

sending the received business ID to a corresponding business client by the client of the long connection, for the corresponding business client reporting the business ID to a corresponding business server;

after the server of the long connection receiving business information pushed by the business server, sending the business information to the client of the long connection through the channel according to the business ID by the server of the long connection;

pushing the business information to the business client according to the business ID by the client of the long connection.

Preferably, the server of the long connection configuring an unique business ID to each business according to an application request of each business, and sending the business ID to the server of the long connection includes:

receiving an application request of business label sent by each business by the server of the long connection, and returning the business label back to the business client according to the application request of business label;

receiving the business label sent by the business client by the client of the long connection, and establishing an unique characteristic value by the client of the long connection for recognition a terminal according to attribute information of the terminal comprising the client of the long connection, sending the business label and the characteristic value together to the server of the long connection by the client of the long connection;

generating the business ID corresponding to each business according to the business label and the characteristic value by the server of the long connection, and sending the business ID to the client of the long connection.

Preferably, the client of the long connection establishing a channel for transmitting data to a server of the long connection, and acquiring a heartbeat time to maintain a survival of the long connection includes:

confirming an original heartbeat time according a current network environment;

calculating a first heartbeat time according to the original heartbeat time, and sending the first heartbeat time to the server of the long connection, when a feedback from the server of the long connection is received, regarding the first heartbeat time as a new original heartbeat time which is used for calculating a second heart beat time, sending the second heartbeat time to the server of the long connection, until no feedback from the server of the long connection is received;

when the feedback from the server of the long connection is not received, sending the original heartbeat time to the server of the long connection, when the feedback from the server of the long connection corresponding the original heartbeat time is received, sending a previous heartbeat time of the second heartbeat time to the server of the long connection;

after the feedback from the server of the long connection is received, calculating an original heartbeat increasing step according to the second heartbeat time and the previous heartbeat time;

calculating a third heartbeat time according to the original heartbeat increasing step and the second heartbeat time, calculating a new heartbeat increasing step according to the original heartbeat increasing step, calculating a fourth heartbeat time according to the new heartbeat increasing step and the third heartbeat time, until the fourth heartbeat time reaches a preset limit value or the heartbeat increasing step is zero, regarding the fourth heartbeat time as the heartbeat time to maintain the survival of the long connection.

Preferably, the formula of calculating the heartbeat time is:

$$f(n)=2*f(n-1);$$

and, $n \geq 1$, the original heartbeat time $f(0)$ is 10~20 seconds; when $n=1$, the first heartbeat time is $f(1)=2*f(0)$; when n is increasing, the second heartbeat time is got.

Preferably, the formula of calculating the original heartbeat increasing step:

$B0=(f(n)-f(n-1))/2$; and $n \geq 1$, B0 presents for the original heartbeat increasing step, $f(n)$ presents for the second heartbeat time, $f(n-1)$ presents for the previous heartbeat time of the second heartbeat time;

the new heartbeat increasing step is calculated according to a following formula:

$Bn=(Bn-1)/2$; and $n \geq 1$, Bn presents for the new heartbeat increasing step, $Bn-1$ presents for the previous heartbeat increasing step of the new heartbeat increasing step;

the third heartbeat time and the fourth heartbeat time are calculated according to a following formula:

$f'(n)=f'(n-1)+Bn$; and, $n \geq 1$, when $n=1$, the third heartbeat time is calculated; when n increases, the fourth heartbeat time is got.

Preferably, calculating the first heartbeat time according to the original heartbeat time, and sending the first heartbeat time to the server of the long connection, when receiving a feedback from the server of the long connection, regarding the first heartbeat time as a new original heartbeat time which is used for calculating a second heart beat time, sending the second heartbeat time to the server of the long connection until no feedback from the server of the long connection is received includes:

when a preset number of sending the first heartbeat time or the second heartbeat time to the server of the long connection is not met another preset number of the feedback from the server of the long connection, confirming no feedback from the server of the long connection is received.

In addition, in order to achieve the aim, the present disclosure also provides a long connection sharing system for multi-businesses, which includes a client of the long connection and a server of the long connection, wherein, the client of the long connection, which is used for establishing a channel for transmitting data to the server of the long connection, and acquiring a heartbeat time to maintain a survival of the long connection;

the server of the long connection, which is used for configuring an unique business ID to each business according to an application request of each business, and sending the business ID to the server of the long connection;

the client of the long connection, which is used for sending the received business ID to a corresponding business client, for the corresponding business client reporting the business ID to a corresponding business server;

the server of the long connection, which is used for sending the business information to the client of the long connection through the channel according to the business ID after receiving business information pushed by the business server;

the client of the long connection, which is used for pushing the business information to the business client according to the business ID.

Preferably, the server of the long connection is also used for receiving an application request of business label sent by each business, and returning the business label back to the business client according to the application request of business label;

the client of the long connection is also for receiving the business label sent by the business client, and establishing an unique characteristic value for recognition a terminal according to attribute information of the terminal including the client of the long connection, sending the business label and the characteristic value together to the server of the long connection;

the server of the long connection, which is used for generating the business ID corresponding to each business according to the business label and the characteristic value, and sends the business ID to the client of the long connection.

In addition, in order to achieve the aim, the present disclosure also provides a method for acquiring a heartbeat time of a long connection includes the following steps:

an original heartbeat time is confirmed according a current network environment;

a first heartbeat time is calculated according to the original heartbeat time, and sending the first heartbeat time to the server of the long connection, when receiving a feedback from the server of the long connection, the first heartbeat time is regarded as a new original heartbeat time which is used for calculating a second heart beat time, sending the second heartbeat time to the server of the long connection, until no feedback from the server of the long connection is received;

the original heartbeat time is sent to the server of the long connection when the feedback from the server of the long connection is not received, a previous heartbeat time of the second heartbeat time is sent to the server of the long connection when receiving the feedback from the server of the long connection corresponding the original heartbeat time;

after receiving the feedback from the server of the long connection, an original heartbeat increasing step is calculated according to the second heartbeat time and the previous heartbeat time;

a third heartbeat time is calculated according to the original heartbeat increasing step and the second heartbeat time, a new heartbeat increasing step is calculated according to the original heartbeat increasing step, a fourth heartbeat time is calculated according to the new heartbeat increasing step and the third heartbeat time, until the fourth heartbeat time reaches a preset limit value or the heartbeat increasing step is zero, the fourth heartbeat time is regarded as the heartbeat time to maintain the survival of the long connection.

Preferably, the formula of calculating the heartbeat time is:

$$f(n)=2*f(n-1);$$

and, $n \geq 1$, the original heartbeat time $f(0)$ is 10~20 seconds; when $n=1$, the first heartbeat time is $f(1)=2*f(0)$; when n is increasing, the second heartbeat time is got.

Preferably, The method for acquiring a heartbeat time of a long connection according to claim 11, wherein the formula of calculating the original heartbeat increasing step is:

B0=(f(n)−f(n−1))/2; and n≥1, B0 presents for the original heartbeat increasing step, f(n) presents for the second heartbeat time, f(n−1) presents for the previous heartbeat time of the second heartbeat time;

the new heartbeat increasing step is calculated according to a following formula:

Bn=(Bn−1)/2; and n≥1, Bn presents for the new heartbeat increasing step, Bn−1 presents for the previous heartbeat increasing step of the new heartbeat increasing step;

the third heartbeat time and the fourth heartbeat time are calculated according to a following formula:

f'(n)=f'(n−1)+Bn; and, n≥1, when n=1, the third heartbeat time is calculated; when n increases, the fourth heartbeat time is got.

Preferably, calculating the first heartbeat time according to the original heartbeat time, and sending the first heartbeat time to the server of the long connection, when receiving a feedback from the server of the long connection, regarding the first heartbeat time as a new original heartbeat time which is used for calculating a second heart beat time, sending the second heartbeat time to the server of the long connection until no feedback from the server of the long connection is received includes:

when a preset number of sending the first heartbeat time or the second heartbeat time to the server of the long connection is not met another preset number of the feedback from the server of the long connection, no feedback from the server of the long connection is received is confirmed.

In addition, in order to realize the above aim, the present disclosure also provides a device for acquiring a heartbeat time of a long connection, includes:

an original heartbeat time acquiring module, which is used for confirming an original heartbeat time according a current network environment;

an second heartbeat time acquiring module, which is used for calculating a first heartbeat time according to the original heartbeat time, and sending the first heartbeat time to the server of the long connection, when receiving a feedback from the server of the long connection, regarding the heartbeat time as a new original heartbeat time which being used for calculating a second heart beat time, sending the second heartbeat time to the server of the long connection, until no feedback from the server of the long connection being received;

a sending module, which is used for sending the original heartbeat time to the server of the long connection when the feedback from the server of the long connection being not received, sending a previous heartbeat time of the second heartbeat time to the server of the long connection when receiving the feedback from the server of the long connection corresponding the original heartbeat time;

an original heartbeat increasing step acquiring module, which is used for calculating an original heartbeat increasing step according to the second heartbeat time and the previous heartbeat time after receiving the feedback from the server of the long connection;

a fourth heartbeat time acquiring module, which is used for calculating a third heartbeat time according to the original heartbeat increasing step and the second heartbeat time, calculating a new heartbeat increasing step according to the original heartbeat increasing step, calculating a fourth heartbeat time according to the new heartbeat increasing step and the third heartbeat time, until the fourth heartbeat time reaching a preset limit value or the heartbeat increasing step being zero, regarding the fourth heartbeat time as the heartbeat time to maintain the survival of the long connection.

Preferably, the formula of calculating the heartbeat time is:

$$f(n)=2*f(n-1);$$

and, n≥1, the original heartbeat time f(0) is 10~20 seconds; when n=1, the first heartbeat time is f(1)=2*f(0); when n is increasing, the second heartbeat time is got.

Preferably, the formula of calculating the original heartbeat increasing step is:

B0=(f(n)−f(n−1))/2 and n≥1, B0 presents for the original heartbeat increasing step, f(n) presents for the second heartbeat time, f(n−1) presents or the previous heartbeat time of the second heartbeat time;

the new heartbeat increasing step is calculated according to a following formula:

Bn=(Bn−1)/2; and n≥1, Bn presents for the new heartbeat increasing step, Bn−1 presents for the previous heartbeat increasing step of the new heartbeat increasing step;

the third heartbeat time and the fourth heartbeat time are calculated according to a following formula:

f(n)=f(n−1)+Bn; and, n≥1, when n=1, the third heartbeat time is calculated; when n increases, the fourth heartbeat time is got.

Preferably, the second heartbeat time acquiring module is also used for confirming that no feedback from the server of the long connection is received, when a preset number of sending the first heartbeat time or the second heartbeat time to the server of the long connection is not met another preset number of the feedback from the server of the long connection.

In addition, in order to realize the above aim, the present disclosure also provides a terminal, the terminal includes the device for acquiring the heartbeat time of a long connection.

After the client of an exemplary embodiment of the present disclosure establishes a channel with the server of the long connection, the heartbeat time is acquired to maintain the survive of the long connection. During a process of sharing the long connection among multi-businesses, the server of the long connection configures the unique business ID to each business according to an application request of each business, and sends the business ID to the server of the long connection. The client of the long connection sends the received business ID to the corresponding business client, for the corresponding business client reporting the business ID to a corresponding business server. After the server of the long connection receives business information pushed by the business server, the server of the long connection sends the business information to the client of the long connection through the channel according to the business ID, the client of the long connection pushes the business information to the business client according to the business ID. Therefore, multi-businesses share a long connection is realized, to improve the Utilization rate of the long connection.

The realizing of the aim, functional characteristics, advantages of the present disclosure are further described in detail with reference to the accompanying drawings and the embodiments.

DETAILED DESCRIPTION OF PREFERRED EMBODIMENTS

It is to be understood that, the described embodiments are only some exemplary embodiments of the present disclosure, and the present disclosure is not limited to such embodiments.

Figure 1:
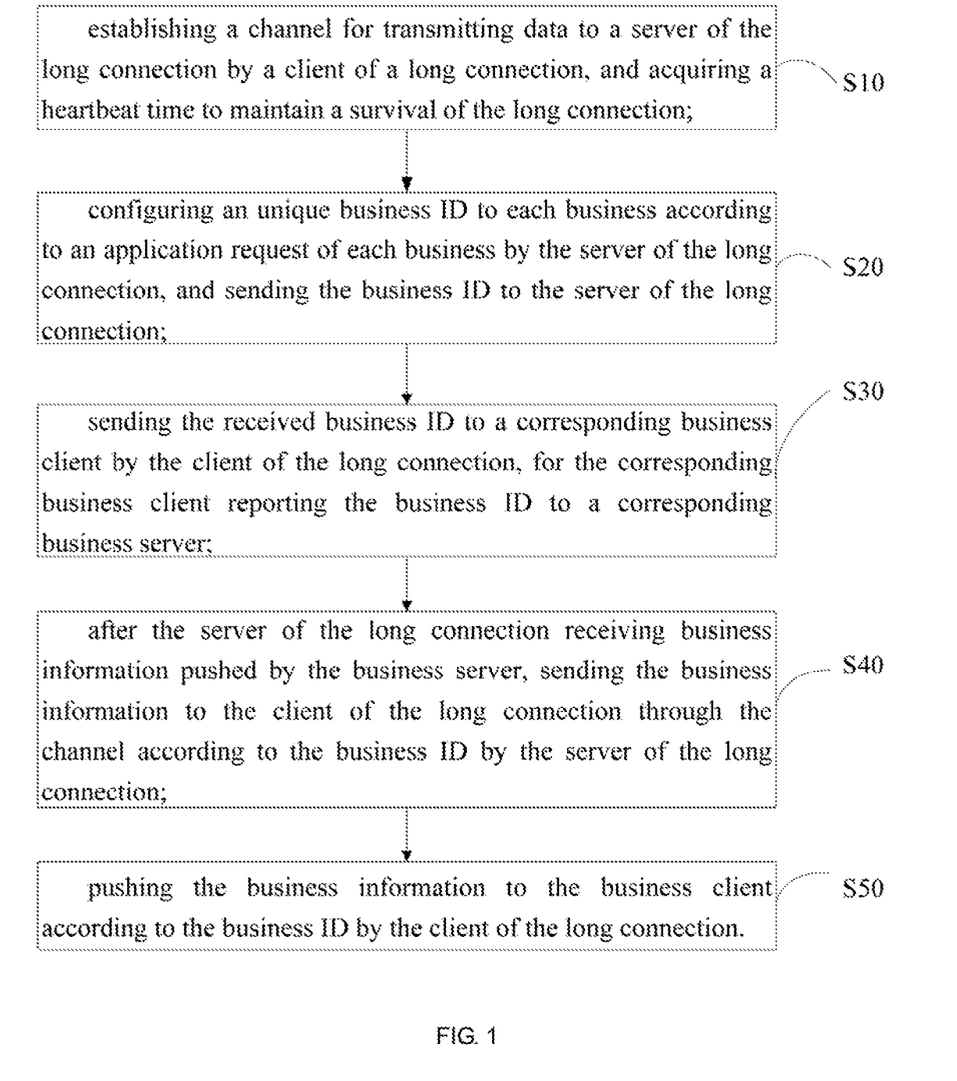
FIG. 1 is a flow diagram of a long connection sharing method for multi-businesses provided by an exemplary embodiment of the present disclosure.

Referring to FIG. 1, FIG. 1 shows a long connection sharing method for multi-businesses, which includes the following steps:

Step S10, establishing a channel for transmitting data to a server of the long connection by a client of a long connection, and acquiring a heartbeat time to maintain a survival of the long connection;

In the exemplary embodiment, in order to improve the safety of transmitting business information in the long connection, a stable and self-adaptive long connection is established from a system level of a terminal. The client of the long connection in the terminal needs to establish the channel with the server of the long connection, for transmitting the data according to a network protocol, the type of the terminal can be set according to actual demand, such as a phone, a computer, a smart television and so on.

In detail, during the establishing the long connection, the client of the long connection in the terminal establishes the channel for transmitting the data to the server of the long connection, such as, establishing TCPSocket. The client of the long connection sends an online order to the server of the long connection according to an information protocol, at the same time, the client of the long connection waits for receiving order sent by the server of the long connection. The information protocol can be a preset network protocol of the transmitting data, such as, the client of the long connection sends "1" as the online order, "2" as the offline order, sending order can be "3" sent by the server of the long connection, which presents that the information from the client of the long connection is received. When the client of the long connection receives a replay from the server of the long connection, which presents that the server of the long connection has already receives the online order sent by the client of the long connection, at this time, the information is analyzed according to the information protocol, to get a content of the sent information, the got current heartbeat time is sent to the server of the long connection, and the client of the long connection waits that the server returns the heartbeat time. Repeating that after the client of the long connection receives the information from the server of the long connection continuously, the information is analyzed according to the information protocol, and the current heartbeat time is acquired to be sent to the server of the long connection, until a best heartbeat time is acquired, for maintaining the survive of the long connection by the heartbeat time, that is, the stability of the channel is maintained. The established long connection can be shared by multi-businesses.

Step S20, configuring an unique business ID to each business according to an application request of each business by the server of the long connection, and sending the business ID to the server of the long connection;

According to the established long connection, during a process of multi-businesses sharing the long connection, in order to distinguish each business effectively, each business applies to the server of the long connection to acquire a serial number, that is, each business sends a request of applying business ID to the business of the long connection, after the server of the long connection receives the requests, the server of the long connection configures an unique business ID for each business, and sends the configured business ID to the client of the long connection, for the client of the long connection sending the business ID to the business client.

Step S30, sending the received business ID to a corresponding business client by the client of the long connection, for the corresponding business client reporting the business ID to a corresponding business server;

After the client of the long connection receives each business ID sent by the server of the long connection, sends each business ID to corresponding business client. After each business client receives the business ID, reports the business ID to corresponding business server.

Step 40, after the server of the long connection receiving business information pushed by the business server, sending the business information to the client of the long connection through the channel according to the business ID by the server of the long connection;

After the business server gets the business ID, the business server sends the business information and the business ID which are need to be pushed together to the server of the long connection. After the server of the long connection receives the business information and the business ID pushed by the business server, finds a terminal including the client of the long connection according to the business ID, established the channel for transmitting data between the server of the long connection and the client of the long connection, sends the business information to the client of the long connection.

Step 50, pushing the business information to the business client according to the business ID by the client of the long connection.

After the client of the long connection receives the business ID and the business information sent by the server of the long connection, the client of the long connection finds corresponding business according to the business ID, and pushes the business information to the business client.

Taking the smart television as an example to illustrate:

First, the client of the long connection in the smart television establishes the channel for transmitting the data to the server of the long connection by the network protocol, that is, a long connection is established, the client of the long connection can be named as com.tianci.push.

Each of three businesses, such as an update business, a film pushing business, a module updating business in the smart television, respectively applies one business label from the established long connection.

After the business labels are applied, the update business, the film pushing business, the module updating business use android broadcast for sending package names of themselves (that is, key information of the business) and corresponding business label to com.tianci.push.

After com.tianci.push receives the package names of themselves and corresponding business label sent from the three businesses, com.tianci.push associates the three business labels with corresponding package name respectively, and stores them in a database.

Com.tianci.push establishes a characteristic value of the long connection corresponding to the smart television according to related information of the smart television, the characteristic value is unique, and the characteristic value can include a version number, a physical address of the smart television.

Com.tianci.push sends the characteristic value and the three business labels to the server of the long connection by the data transmitting channel, the server of the long connection generates a business ID of each business according to the characteristic value and the three business labels, and returns the business ID and corresponding business label to com.tianci.push.

Com.tianci.push updates the database according to the business labels of the three businesses, that is, com.tianci.push associates the business labels of the three businesses, each business ID with each package name respectively, and stores them in the database. At the same time, the packages of the three businesses are found, and the three business IDs are sent to corresponding businesses.

In detail, such as, after the film pushing business receives the business ID, the film pushing business reports the business ID to a server of the film pushing business. The film pushing business sends the business ID and film pushing business information to the server of the long connection. The server of the long connection finds the smart television device according to the business ID, and send the business ID and the film pushing business information to the com.tianic.push located in the smart television. Com.tianic.push the package name of the film pushing business according to the business ID, and sends the film pushing business information to a client of the film pushing business accordingly. The client of the film pushing business analyzes and deals with the received information according to protocol of itself.

The client of the long connection of the exemplary embodiment of the present disclosure acquires the heartbeat time to survive the long connection by establishing the channel with the server of the long connection. During the sharing process of the long connection by multi-businesses, the server of the long connection configures one unique business ID to each business according to the request of each business, and sends the business ID to the client of the long connection. The client of the long connection sends the received business ID to corresponding to the business client, for the business client reporting the business ID to corresponding business server. After the server of the long connection receives the business information pushed by the business server, the server of the long connection send the business information to the client of the long connection by the channel according to the business ID. So that multi-businesses shares one long connection can be realized, and the Utilization rate of the long connection can be improved.

Figure 2:
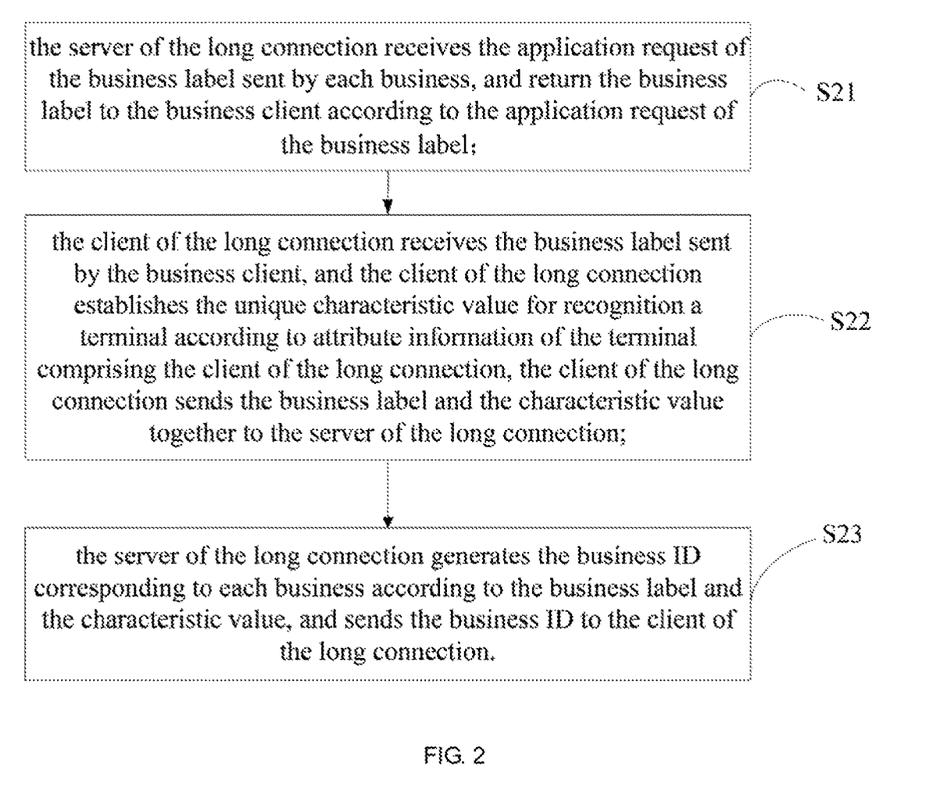
FIG. 2 is a detail flow diagram of configuring an unique business ID to each business according to an application request of each business by the server of the long connection, and sending the business ID to the server of the long connection during the long connection sharing method for multi-businesses of the present disclosure.

Furthermore, referring to FIG. 2, based on the above exemplary embodiment, the step S20 can includes:

Step S21, receiving the application request of the business label sent by each business by the server of the long connection, and returning the business label to the business client according to the application request of the business label;

According to the established long connection, the process of the server of the long connection configures unique business ID according to the application request of each business can be, in detail, first each business request a business label from the server of the long connection, the server of the long connection returns the business label to corresponding business client according to the application request of the business label sent by each business. Then, on the terminal, each business client sends each business label to the client of the long connection. It is to be understood that, the multi-businesses can be two or more than two businesses, of course, if one single business uses the long connection, it is no need to apply the business label from the server of the long connection.

Step S22, receiving the business label sent by the business client by the client of the long connection, and establishing the unique characteristic value by the client of the long connection for recognition a terminal according to attribute information of the terminal including the client of the long connection, sending the business label and the characteristic value together to the server of the long connection by the client of the long connection;

After the client of the long connection receives the business label, the client of the long connection takes each business label and corresponding key information as a pair of key value, and associates each business label with corresponding key information, and stores them in the database, for acquiring the key information of the business according to the business label. The key information of the business can include the name of the business.

In the exemplary embodiment, according to the terminal having the client of the long connection, the attribute information of the terminal is acquired and taken as the unique characteristic value for recognizing the terminal, such as, the characteristic value can includes the physical address, the version number of the terminal having the client of the connection, and so on. Then the each business label and the characteristic value of the long connection are sent to the server of the long connection simultaneously, for the server of the long connection can generate the business ID of each business according to each business label and the characteristic value.

Step S23, generating the business ID corresponding to each business according to the business label and the characteristic value by the server of the long connection, and sending the business ID to the client of the long connection.

After the server of the long connection receives each business label and the characteristic value, the server of the long connection applies each corresponding business label from the server of the long connection according to each business, and check whether each business label is right, that is, whether the business label is the business label applied from the server of the long connection previously. If right, the server of the long connection generates the unique business ID according to the characteristic value of the long connection and each business label, and returns each business ID and corresponding business label to the client of the long connection. After the client of the long connection receives each business ID and corresponding business label, the client of the long connection associates the business ID of each business, and the business label and the key information through the business label, and stores them in the database, for updating the database storing the key information corresponding to the business and each corresponding business.

Figure 3:
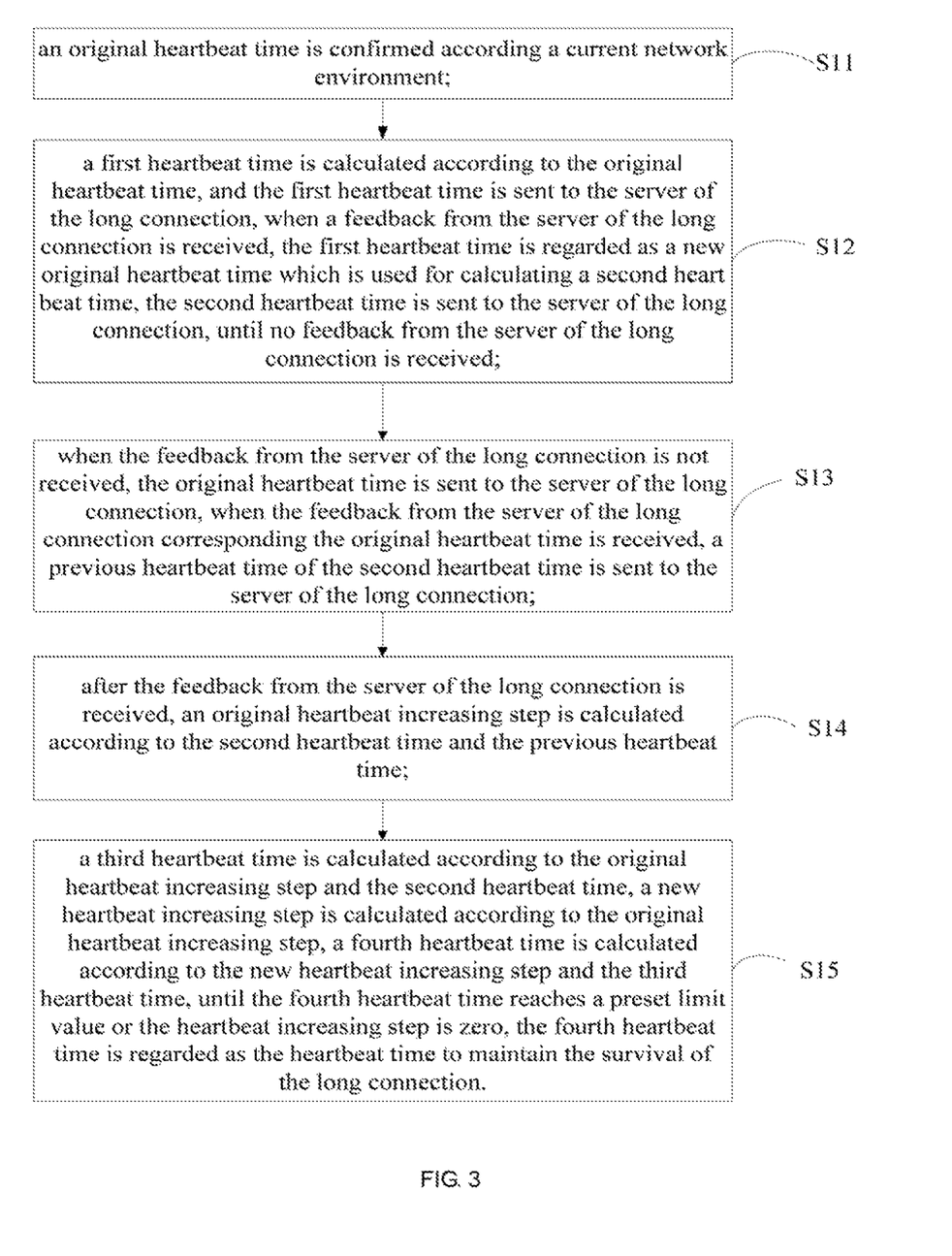
FIG. 3 is a detail flow diagram of establishing a channel for transmitting data to a server of the long connection by the client of the long connection, and acquiring a heartbeat time to maintain a survival of the long connection during the long connection sharing method for multi-businesses of the present disclosure.

Furthermore, referring to FIG. 3, based on the above exemplary embodiment, the step S10 can includes:

Step S11, confirming an original heartbeat time according a current network environment;

After the client of the long connection is connected with the server of the long connection, the client of the long connection sends relative information related to the client of the long connection to the server of the long connection, for the server of the long connection recognizing the client of the long connection, to finish a process of online initialization of the server of the long connection.

As the original heartbeat time is related with the network environment, so the client of the long connection initializes the original heartbeat time through testing the current network environment according to the current network of the terminal. Of course, there is no need to test the network environment, and directly assigns a default initialization value as the original heartbeat time, the default initialization value can be set to be 10-50 seconds, or can be flexibly set according to detail environment.

Step S12, calculating a first heartbeat time according to the original heartbeat time, and sending the first heartbeat time to the server of the long connection, when a feedback from the server of the long connection is received, regarding the first heartbeat time as a new original heartbeat time which is used for calculating a second heart beat time, sending the second heartbeat time to the server of the long connection, until no feedback from the server of the long connection is received;

After the original heartbeat time is got, the client of the long connection can calculate the heartbeat time according to a formula: $f(n)=2*f(n-1)$, and, the original heartbeat time $f(0)$ is 10~50 seconds. When n=1, the first heartbeat time is $f(1)=2*f(0)$; when n increases, the second heartbeat time is got. After the client of the long connection gets the first heartbeat time, sends the first heartbeat time to the server of the long connection. When the feedback of the server of the long connection is received, it states that the first heartbeat time can successfully maintain the survive of the long connection, then the first heartbeat time can be regarded as a new heartbeat time for calculating the second heartbeat time, that is, n can gradually increase by 1 step, and the second heartbeat time is repeatedly calculated according to the formula. The second heartbeat time can be continually sent to the server of the long connection, until no feedback from the server of the long connection can be received, and calculating the second heartbeat time according to the formula can be stopped. It is to be understood that, the feedback from the server of the long connection can be the heartbeat time returning to the client of the long connection, or returning information according to the preset specified protocol. The second heartbeat time is repeatedly calculated through the formula, so that during the process of finding the best heartbeat time, when the heartbeat time increases, it is need to find a threshold value of the heartbeat time as little as possible.

It is to be understood that, in order to improve the stability of acquiring the heartbeat time, the client of the long connection can send the first heartbeat time or the second heartbeat time to the server of the long connection many times. When a preset sending number of sending the first heartbeat time or the second heartbeat time to the server if the long connection does not met a received preset feedback number from the server of the long connection, or it is confirmed that no feedback from the server of the long connection is received. The preset sending number and the preset number can be flexibly adjusted according to detail case. Such as, the client of the long connection sends three times of the first heartbeat time to the server of the long connection, during the three times, if the three times all receive the feedback from the server of the long connection, it is noted that when the client of the long connection send the first heartbeat time to the server of the long connection, the client of the long connection can receive the feedback from the server of the long connection successfully.

Step S13, when the feedback from the server of the long connection is not received, sending the original heartbeat time to the server of the long connection, when the feedback from the server of the long connection corresponding the original heartbeat time is received, sending a previous heartbeat time of the second heartbeat time to the server of the long connection.

When the client of the long connection does not receive the feedback from the server of the long connection for the second heartbeat time, the client of the long connection tries by using the original heartbeat time, that is, the client of the long connection sends the original heartbeat time to the server of the long connection, for testing that whether the client of the long connection receives the original heartbeat time returned by the server of the long connection. It is to be understood that the client of the long connection can send the original heartbeat time to the server of the long connection many times, and the client of the long connection correspondingly processes according to whether it meets that the client of the long connection receives the feedback the preset feedback times on time. Such as, the client of long connection can send the original heartbeat time to the server of the long connection five times, when it meets that the client of the long connection receives the feedback five times or four times, it is noted that the client of the long connection successfully receives the feedback of the server of the long connection, or it fails.

In the exemplary embodiment, when the client of the long connection has not received the feedback from the server of the long connection for the original heartbeat time, go to step S11, the heartbeat time is initialized again. When the client of the long connection receives the feedback from the server of the long connection for the original heartbeat time, the client of the long connection tries using the previous heartbeat time before the second heartbeat time, that the previous heartbeat time before the second heartbeat time is sent to the server of the long connection. When the second heartbeat time is that the client of the long connection cannot receive the feedback from the server of the long connection for the second heartbeat time, the second heartbeat is finally sent. The sending times of the previous heartbeat time can be flexibly adjusted according to detail case, and the client of the long connection correspondingly processes according to whether it meets that the client of the long connection receives the preset feedback times on time from the server of the long connection.

Step S14, after the feedback from the server of the long connection is received, calculating an original heartbeat increasing step according to the second heartbeat time and the previous heartbeat time;

In the exemplary embodiment, when the client of the long connection has not received the feedback from the server of the long connection for the previous heartbeat time, go to step S11, the heartbeat time is initialized again. When the client of the long connection receives the feedback from the server of the long connection for the previous heartbeat time, the original heartbeat increasing step is calculated according to the formula $B_0=(f(n)-f(n-1))/2$. And, $n\geq 1$, $B_0$ presents for the original heartbeat increasing step, $f(n)$ presents for the second heartbeat time, $f(n-1)$ presents for the previous heartbeat time of the second heartbeat time.

Step S15, calculating a third heartbeat time according to the original heartbeat increasing step and the second heartbeat time, calculating a new heartbeat increasing step according to the original heartbeat increasing step, calculating a fourth heartbeat time according to the new heartbeat increasing step and the third heartbeat time, until the fourth heartbeat time reaches a preset limit value or the heartbeat increasing step is zero, regarding the fourth heartbeat time as the heartbeat time to maintain the survival of the long connection.

After the original heartbeat increasing step $B_0$ is got, a new heartbeat increasing step is calculated according to formula: $B_0=(B_{n-1})/2$. And, $N\geq 1$, $B_n$ presents for the new heartbeat increasing step, $B_{n-1}$ presents for the previous heartbeat increasing step of the new heartbeat increasing step. Then the third heartbeat time and the fourth heartbeat time are calculated according to $f(n)=f(n-1)+B_n$. After the threshold value are calculated according to the formula, the best value is found quickly. And, $n\geq 1$, when $n=1$, the third heartbeat time is calculated according to the original heartbeat increasing step $B_0$ and the second heartbeat time. Then, the client of the long connection sends the got third heartbeat time to the server of the long connection, and when the client of the long connection receives the feedback of the server of the long connection, n gradually increases by 1 step, the fourth heartbeat time is got according to the formula. When the feedback from the server of the long connection has not been received, go to step S13, the original heartbeat time is sent to the server of the long connection for trying. Then the client of the long connection sends the fourth heartbeat time to the server of the long connection, and when the client of the long connection receives the feedback from the server of the long connection for the fourth heartbeat time, n gradually increases, the fourth heartbeat time is continuously calculated, until the fourth heartbeat time reaches a preset limit value or the heartbeat increasing step is zero, the fourth heartbeat time is regarded as the heartbeat time to maintain the survival of the long connection.

Accordingly, the present disclosure provides a long connection sharing system for multi-businesses, in an exemplary embodiment, the long connection sharing system for multi-businesses includes a client of the long connection and a server of the long connection, and, the client of the long connection, which is used for establishing a channel for transmitting data to a server of the long connection, and acquiring a heartbeat time to maintain a survival of the long connection:

In the exemplary embodiment, in order to improve the safety of transmitting business information in the long connection, a stable and self-adaptive long connection is established from a system level of a terminal. The client of the long connection in the terminal needs to establish the channel with the server of the long connection, for transmitting the data according to a network protocol, the type of the terminal can be set according to actual demand, such as a phone, a computer, a smart television and so on.

In detail, during the establishing the long connection, the client of the long connection in the terminal establishes the channel for transmitting the data to the server of the long connection, such as, establishing TCPSocket. The client of the long connection sends an online order to the server of the long connection according to an information protocol, at the same time, the client of the long connection waits for receiving order sent by the server of the long connection. The information protocol can be a preset network protocol of the transmitting data, such as, the client of the long connection sends "1" as the online order, "2" as the offline order, sending order can be "3" sent by the server of the long connection, which presents that the information from the client of the long connection is received. When the client of the long connection receives a replay from the server of the long connection, which presents that the server of the long connection has already receives the online order sent by the client of the long connection, at this time, the information is analyzed according to the information protocol, to get a content of the sent information, the got current heartbeat time is sent to the server of the long connection, and the client of the long connection waits that the server returns the heartbeat time. Repeating that after the client of the long connection receives the information from the server of the long connection continuously, the information is analyzed according to the information protocol, and the current heartbeat time is acquired to be sent to the server of the long connection, until a best heartbeat time is acquired, for maintaining the survive of the long connection by the heartbeat time, that is, the stability of the channel is maintained. The established long connection can be shared by multi-businesses.

the server of the long connection, which is used for configuring an unique business ID to each business according to an application request of each business, and sending the business ID to the server of the long connection;

According to the established long connection, during a process of multi-businesses sharing the long connection, in order to distinguish each business effectively, each business applies to the server of the long connection to acquire a serial number, that is, each business sends a request of applying business ID to the business of the long connection, after the server of the long connection receives the requests, the server of the long connection configures an unique business ID for each business, and sends the configured business ID to the client of the long connection, for the client of the long connection sending the business ID to the business client.

the client of the long connection, which is used for sending the received business ID to a corresponding business client, for the corresponding business client reporting the business ID to a corresponding business server;

After the client of the long connection receives each business ID sent by the server of the long connection, the client of the long connection sends each business ID to corresponding business client. After each business client receives the business ID, reports the business ID to corresponding business server.

the server of the long connection, which is used for sending the business information to the client of the long connection through the channel according to the business ID, after the server of the long connection receives business information pushed by the business server;

After the business server gets the business ID, the business server sends the business information and the business ID which are need to be pushed together to the server of the long connection. After the server of the long connection receives the business information and the business ID pushed by the business server, finds a terminal including the client of the long connection according to the business ID, established the channel for transmitting data between the server of the long connection and the client of the long connection, sends the business information to the client of the long connection.

The client of the long connection, which is used for pushing the business information to the business client according to the business ID.

After the client of the long connection receives the business ID and the business information sent by the server of the long connection, the client of the long connection finds corresponding business according to the business ID, and pushes the business information to the business client.

Taking the smart television as an example to illustrate:

First, the client of the long connection in the smart television establishes the channel for transmitting the data to the server of the long connection by the network protocol, that is, a long connection is established, the client of the long connection can be named as com.tianci.push.

Each of three businesses, such as an update business, a film pushing business, a module updating business in the smart television, respectively applies one business label from the established long connection.

After the business labels are applied, the update business, the film pushing business, the module updating business use android broadcast for sending package names of themselves (that is, key information of the business) and corresponding business label to com.tianci.push.

After com.tianci.push receives the package names of themselves and corresponding business label sent from the three businesses, com.tianci.push associates the three business labels with corresponding package name respectively, and stores them in a database.

Com.tianci.push establishes a characteristic value of the long connection corresponding to the smart television according to related information of the smart television, the characteristic value is unique, and the characteristic value can include a version number, a physical address of the smart television.

Com.tianci.push sends the characteristic value and the three business labels to the server of the long connection by the data transmitting channel, the server of the long connection generates a business ID of each business according to the characteristic value and the three business labels, and returns the business ID and corresponding business label to com.tianci.push.

Com.tianci.push updates the database according to the business labels of the three businesses, that is, com.tianci.push associates the business labels of the three businesses, each business ID with each package name respectively, and stores them in the database. At the same time, the packages of the three businesses are found, and the three business IDs are sent to corresponding businesses.

In detail, such as, after the film pushing business receives the business ID, the film pushing business reports the business ID to a server of the film pushing business. The film pushing business sends the business ID and film pushing business information to the server of the long connection. The server of the long connection finds the smart television device according to the business ID, and send the business ID and the film pushing business information to the com.tianic.push located in the smart television. Com.tianic.push the package name of the film pushing business according to the business ID, and sends the film pushing business information to a client of the film pushing business accordingly. The client of the film pushing business analyzes and deals with the received information according to protocol of itself.

The client of the long connection of the exemplary embodiment of the present disclosure acquires the heartbeat time to survive the long connection by establishing the channel with the server of the long connection. During the sharing process of the long connection by multi-businesses, the server of the long connection configures one unique business ID to each business according to the request of each business and sends the business ID to the client of the long connection. The client of the long connection sends the received business ID to corresponding to the business client, for the business client reporting the business ID to corresponding business server. After the server of the long connection receives the business information pushed by the business server, the server of the long connection send the business information to the client of the long connection by the channel according to the business ID. So that multi-businesses shares one long connection can be realized, and the Utilization rate of the long connection can be improved.

Furthermore, in the exemplary embodiment, the server of the long connection can also be used for receiving the application request of the business label sent by each business, and returning the business labels to the business client according to the application request of the business label.

According to the established long connection, the process of the server of the long connection configures unique business ID according to the application request of each business can be, in detail, first each business request a business label from the server of the long connection, the server of the long connection returns the business label to corresponding business client according to the application request of the business label sent by each business. Then, on the terminal, each business client sends each business label to the client of the long connection. It is to be understood that, the multi-businesses can be two or more than two businesses, of course, if one single business uses the long connection, it is no need to apply the business label from the server of the long connection.

The client of the long connection, which can be used for receiving the business label sent by the business client, and the client of the long connection establishes the unique characteristic value for recognition a terminal according to attribute information of the terminal including the client of the long connection, the client of the long connection sends the business label and the characteristic value together to the server of the long connection;

After the client of the long connection receives the business label, the client of the long connection takes each business label and corresponding key information as a pair of key value, and associates each business label with corresponding key information, and stores them in the database, for acquiring the key information of the business according to the business label. The key information of the business can include the name of the business.

In the exemplary embodiment, according to the terminal having the client of the long connection, the attribute information of the terminal is acquired and taken as the unique characteristic value for recognizing the terminal, such as, the characteristic value can includes the physical address, the version number of the terminal having the client of the connection, and so on. Then the each business label and the characteristic value of the long connection are sent to the server of the long connection simultaneously, for the server of the long connection can generate the business ID of each business according to each business label and the characteristic value.

The server of the long connection, which can be used for generating the business ID corresponding to each business according to the business label and the characteristic value, and sends the business ID to the client of the long connection.

After the server of the long connection receives each business label and the characteristic value, the server of the long connection applies each corresponding business label from the server of the long connection according to each business, and check whether each business label is right, that is, whether the business label is the business label applied from the server of the long connection previously. If right, the server of the long connection generates the unique business ID according to the characteristic value of the long connection and each business label, and returns each business ID and corresponding business label to the client of the long connection. After the client of the long connection receives each business ID and corresponding business label, the client of the long connection associates the business ID of each business, and the business label and the key information through the business label, and stores them in the database, for updating the database storing the key information corresponding to the business and each corresponding business.

Figure 4:
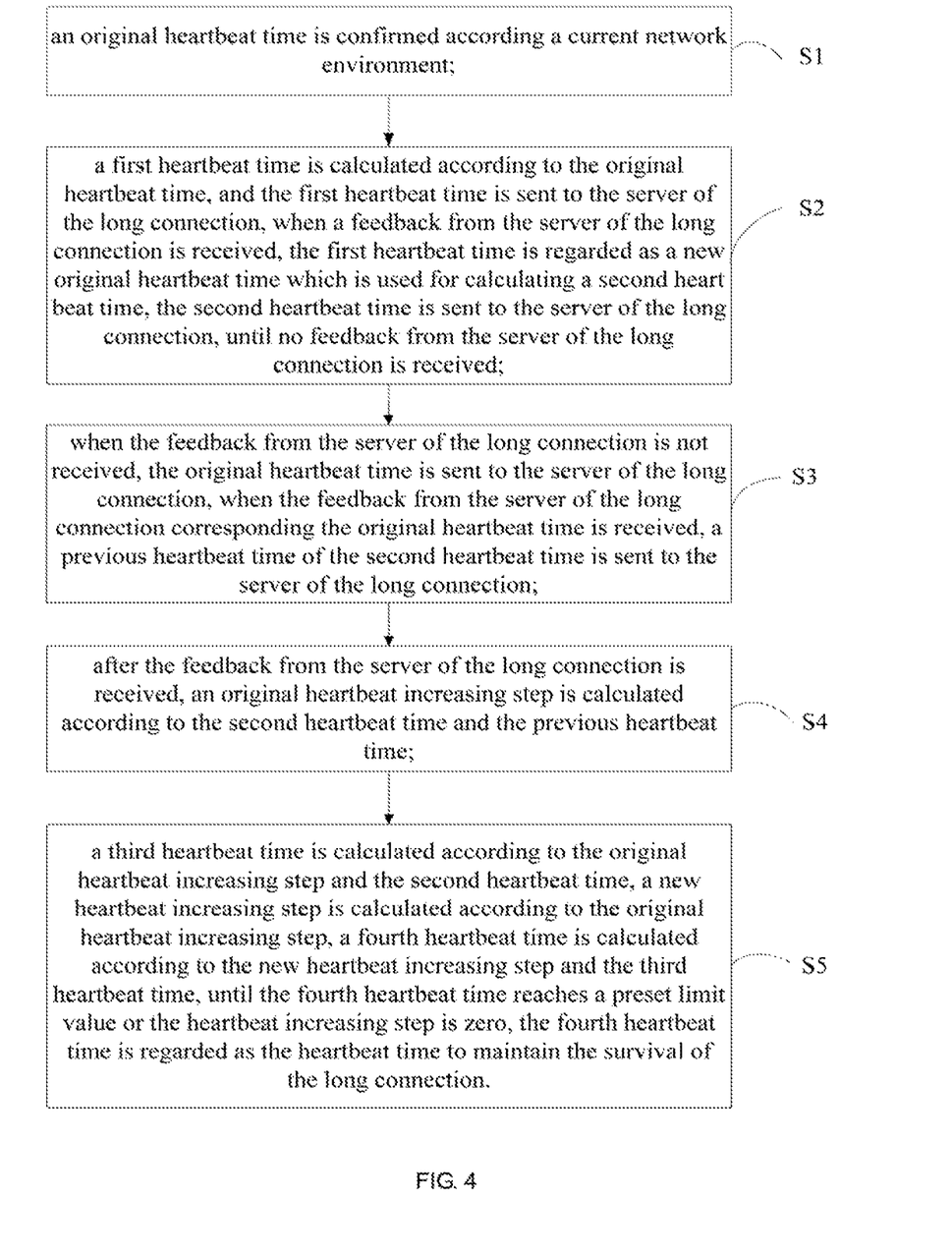
FIG. 4 is a flow diagram of a method for acquiring a heartbeat time of a long connection provided by an exemplary embodiment of the present disclosure.

Accordingly, referring to FIG. 4, the present disclosure provides a method for acquiring a heartbeat time of a long connection. The method for acquiring a heartbeat time of a long connection of the present disclosure includes:

Step S1, confirming an original heartbeat time according a current network environment;

When the client of the long connection is connected with the server of the long connection, the client of the long connection sends relative information related to the client of the long connection to the server of the long connection, for the server of the long connection recognizing the client of the long connection, to finish a process of online initialization of the server of the long connection.

As the original heartbeat time is related with the network environment, so the client of the long connection initializes the original heartbeat time through testing the current network environment according to the current network of the terminal. Of course, there is no need to test the network environment, and directly assigns a default initialization value as the original heartbeat time, the default initialization value can be set to be 10-50 seconds, or can be flexibly set according to detail environment.

Step S2, calculating a first heartbeat time according to the original heartbeat time, and sending the first heartbeat time to the server of the long connection, when a feedback from the server of the long connection is received, regarding the first heartbeat time as a new original heartbeat time which is used for calculating a second heart beat time, sending the second heartbeat time to the server of the long connection, until no feedback from the server of the long connection is received;

After the original heartbeat time is got, the client of the long connection can calculate the heartbeat time according to a formula: $f(n)=2*f(n-1)$, and, $n \geq 1$, the original heartbeat time $f(0)$ is 10~50 seconds. When $n=1$, the first heartbeat time is $f(1)=2*f(0)$; when n increases, the second heartbeat time is got. After the client of the long connection gets the first heartbeat time, sends the first heartbeat time to the server of the long connection. When the feedback of the server of the long connection is received, it states that the first heartbeat time can successfully maintain the survive of the long connection, then the first heartbeat time can be regarded as a new heartbeat time for calculating the second heartbeat time, that is, n can gradually increase by 1 step, and the second heartbeat time is repeatedly calculated according to the formula. The second heartbeat time can be continually sent to the server of the long connection, until no feedback from the server of the long connection can be received, and calculating the second heartbeat time according to the formula can be stopped. It is to be understood that, the feedback from the server of the long connection can be the heartbeat time returning to the client of the long connection, or returning information according to the preset specified protocol. The second heartbeat time is repeatedly calculated through the formula, so that during the process of finding the best heartbeat time, when the heartbeat time increases, it is need to find a threshold value of the heartbeat time as little as possible.

It is to be understood that, in order to improve the stability of acquiring the heartbeat time, the client of the long connection can send the first heartbeat time or the second heartbeat time to the server of the long connection many times. When a preset sending number of sending the first heartbeat time or the second heartbeat time to the server if the long connection does not met a received preset feedback number from the server of the long connection, or it is confirmed that no feedback from the server of the long connection is received. The preset sending number and the preset number can be flexibly adjusted according to detail case. Such as, the client of the long connection sends three times of the first heartbeat time to the server of the long connection, during the three times, if the three times all receive the feedback from the server of the long connection, it is noted that when the client of the long connection send the first heartbeat time to the server of the long connection, the client of the long connection can receive the feedback from the server of the long connection successfully.

Step S3, when the feedback from the server of the long connection is not received, sending the original heartbeat time to the server of the long connection, when the feedback from the server of the long connection corresponding the original heartbeat time is received, sending a previous heartbeat time of the second heartbeat time to the server of the long connection;

When the client of the long connection does not receive the feedback from the server of the long connection for the second heartbeat time, the client of the long connection tries by using the original heartbeat time, that is, the client of the long connection sends the original heartbeat time to the server of the long connection, for testing that whether the client of the long connection receives the original heartbeat time returned by the server of the long connection. It is to be understood that the client of the long connection can send the original heartbeat time to the server of the long connection many times, and the client of the long connection correspondingly processes according to whether it meets that the client of the long connection receives the feedback the preset feedback times on time. Such as, the client of long connection can send the original heartbeat time to the server of the long connection five times, when it meets that the client of the long connection receives the feedback five times or four times, it is noted that the client of the long connection successfully receives the feedback of the server of the long connection, or it fails.

In the exemplary embodiment, when the client of the long connection has not received the feedback from the server of the long connection for the original heartbeat time, go to step S1, the heartbeat time is initialized again. When the client of the long connection receives the feedback from the server of the long connection for the original heartbeat time, the client of the long connection tries using the previous heartbeat time before the second heartbeat time, that the previous heartbeat time before the second heartbeat time is sent to the server of the long connection. When the second heartbeat time is that the client of the long connection cannot receive the feedback from the server of the long connection for the second heartbeat time, the second heartbeat is finally sent. The sending times of the previous heartbeat time can be flexibly adjusted according to detail case, and the client of the long connection correspondingly processes according to whether it meets that the client of the long connection receives the preset feedback times on time from the server of the long connection.

Step S4, after the feedback from the server of the long connection is received, calculating an original heartbeat increasing step according to the second heartbeat time and the previous heartbeat time;

In the exemplary embodiment, when the client of the long connection has not received the feedback from the server of the long connection for the previous heartbeat time, go to step S11, the heartbeat time is initialized again. When the client of the long connection receives the feedback from the server of the long connection for the previous heartbeat time, the original heartbeat increasing step is calculated according to the formula $B_0=(f(n)-f(n-1))/2$. And, $n\geq1$, $B_0$ presents for the original heartbeat increasing step, f(n) presents for the second heartbeat time, f(n−1) presents for the previous heartbeat time of the second heartbeat time.

Step S5, calculating a third heartbeat time according to the original heartbeat increasing step and the second heartbeat time, calculating a new heartbeat increasing step according to the original heartbeat increasing step, calculating a fourth heartbeat time according to the new heartbeat increasing step and the third heartbeat time, until the fourth heartbeat time reaches a preset limit value or the heartbeat increasing step is zero, regarding the fourth heartbeat time as the heartbeat time to maintain the survival of the long connection.

After the original heartbeat increasing step $B_0$ is got, a new heartbeat increasing step is calculated according to formula: $B_n=(B_{n-1})/2$. And, $n\geq1$, Bn presents for the new heartbeat increasing step, $B_{n-1}$ presents for the previous heartbeat increasing step of the new heartbeat increasing step. Then the third heartbeat time and the fourth heartbeat time are calculated according to $f'(n)=f'(n-1)+B_n$. After the threshold value are calculated according to the formula, the best value is found quickly. And, $n\geq1$, when n=1, the third heartbeat time is calculated according to the original heartbeat increasing step $B_0$ and the second heartbeat time. Then, the client of the long connection sends the got third heartbeat time to the server of the long connection, and when the client of the long connection receives the feedback of the server of the long connection, n gradually increases by 1 step, the fourth heartbeat time is got according to the formula. When the feedback from the server of the long connection has not been received, go to step S13, the original heartbeat time is sent to the server of the long connection for trying. Then the client of the long connection sends the fourth heartbeat time to the server of the long connection, and when the client of the long connection receives the feedback from the server of the long connection for the fourth heartbeat time, n gradually increases, the fourth heartbeat time is continuously calculated, until the fourth heartbeat time reaches a preset limit value or the heartbeat increasing step is zero, the fourth heartbeat time is regarded as the heartbeat time to maintain the survival of the long connection.

Figure 5:
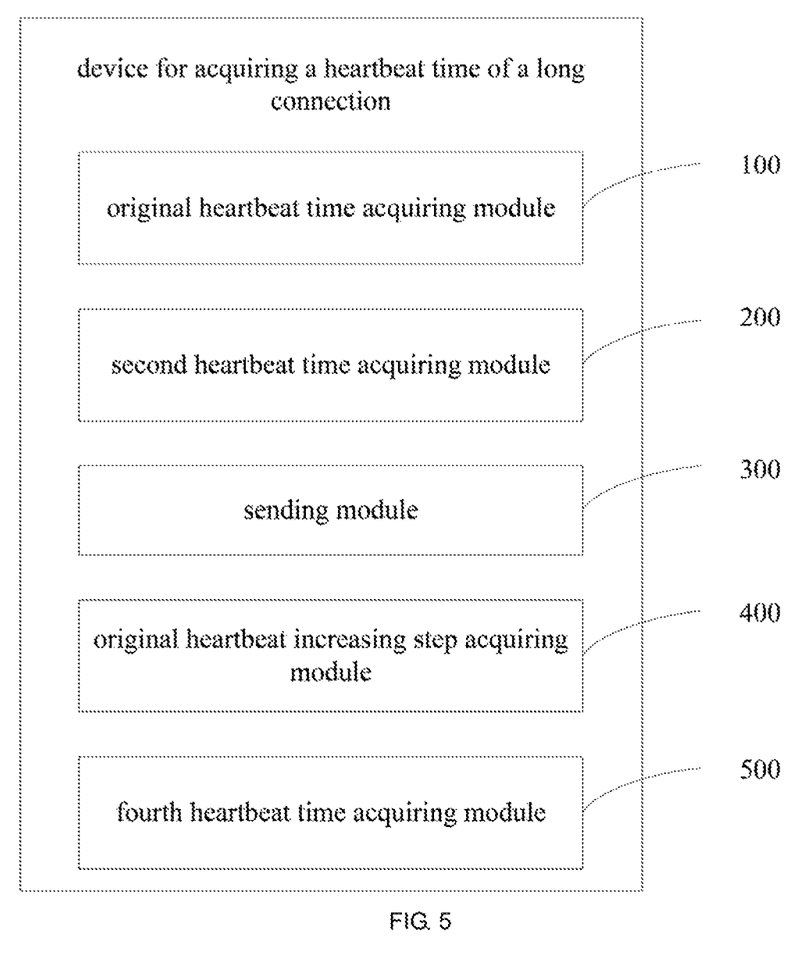
FIG. 5 is a functional module diagram of a device for acquiring a heartbeat time of a long connection provided by an exemplary embodiment of the present disclosure.

Accordingly, referring to FIG. 5, the present disclosure provides a device for acquiring a heartbeat time of a long connection according to an exemplary embodiment. The device for acquiring a heartbeat time of a long connection of the exemplary embodiment includes:

an original heartbeat time acquiring module 100, which is used for confirming an original heartbeat time according a current network environment:

After the client of the long connection is connected with the server of the long connection, the client of the long connection sends relative information related to the client of the long connection to the server of the long connection, for the server of the long connection recognizing the client of the long connection, to finish a process of online initialization of the server of the long connection.

As the original heartbeat time is related with the network environment, so the client of the long connection initializes the original heartbeat time through testing the current network environment according to the current network of the terminal. Of course, there is no need to test the network environment, and directly assigns a default initialization value as the original heartbeat time, the default initialization value can be set to be 10-50 seconds, or can be flexibly set according to detail environment.

an second heartbeat time acquiring module 200, which is used for calculating a first heartbeat time according to the original heartbeat time, and sending the first heartbeat time to the server of the long connection, regarding the first heartbeat time as a new original heartbeat time which being used for calculating a second heart beat time when receiving a feedback from the server of the long connection, sending the second heartbeat time to the server of the long connection, until no feedback from the server of the long connection being received;

After the original heartbeat time is got, the client of the long connection can calculate the heartbeat time according to a formula: $f(n)=2*f(n-1)$, and, the original heartbeat time f(0) is 10~50 seconds. When n=1, the first heartbeat time is $f(1)=2*f(0)$; when n increases, the second heartbeat time is got. After the client of the long connection gets the first heartbeat time, sends the first heartbeat time to the server of the long connection. When the feedback of the server of the long connection is received, it states that the first heartbeat time can successfully maintain the survive of the long connection, then the first heartbeat time can be regarded as a new heartbeat time for calculating the second heartbeat time, that is, n can gradually increase by 1 step, and the second heartbeat time is repeatedly calculated according to the formula. The second heartbeat time can be continually sent to the server of the long connection, until no feedback from the server of the long connection can be received, and calculating the second heartbeat time according to the formula can be stopped. It is to be understood that, the feedback from the server of the long connection can be the heartbeat time returning to the client of the long connection, or returning information according to the preset specified protocol. The second heartbeat time is repeatedly calculated through the formula, so that during the process of finding the best heartbeat time, when the heartbeat time increases, it is need to find a threshold value of the heartbeat time as little as possible.

It is to be understood that, in order to improve the stability of acquiring the heartbeat time, the client of the long connection can send the first heartbeat time or the second heartbeat time to the server of the long connection many times. When a preset sending number of sending the first heartbeat time or the second heartbeat time to the server if the long connection does not met a received preset feedback number from the server of the long connection, or it is confirmed that no feedback from the server of the long connection is received. The preset sending number and the preset number can be flexibly adjusted according to detail case. Such as, the client of the long connection sends three times of the first heartbeat time to the server of the long connection, during the three times, if the three times all receive the feedback from the server of the long connection, it is noted that when the client of the long connection send the first heartbeat time to the server of the long connection, the client of the long connection can receive the feedback from the server of the long connection successfully.

a sending module 300, which is used for sending the original heartbeat time to the server of the long connection when the feedback from the server of the long connection being not received, sending a previous heartbeat time of the second heartbeat time to the server of the long connection when receiving the feedback from the server of the long connection corresponding the original heartbeat time;

When the client of the long connection does not receive the feedback from the server of the long connection for the second heartbeat time, the client of the long connection tries by using the original heartbeat time, that is, the client of the long connection sends the original heartbeat time to the server of the long connection, for testing that whether the client of the long connection receives the original heartbeat time returned by the server of the long connection. It is to be understood that the client of the long connection can send the original heartbeat time to the server of the long connection many times, and the client of the long connection correspondingly processes according to whether it meets that the client of the long connection receives the feedback the preset feedback times on time. Such as, the client of long connection can send the original heartbeat time to the server of the long connection five times, when it meets that the client of the long connection receives the feedback five times or four times, it is noted that the client of the long connection successfully receives the feedback of the server of the long connection, or it fails.

In the exemplary embodiment, when the client of the long connection has not received the feedback from the server of the long connection for the original heartbeat time, the heartbeat time is initialized again. When the client of the long connection receives the feedback from the server of the long connection for the original heartbeat time, the client of the long connection tries using the previous heartbeat time before the second heartbeat time, that the previous heartbeat time before the second heartbeat time is sent to the server of the long connection. When the second heartbeat time is that the client of the long connection cannot receive the feedback from the server of the long connection for the second heartbeat time, the second heartbeat is finally sent. The sending times of the previous heartbeat time can be flexibly adjusted according to detail case, and the client of the long connection correspondingly processes according to whether it meets that the client of the long connection receives the preset feedback times on time from the server of the long connection.

an original heartbeat increasing step acquiring module 400, which is used for calculating an original heartbeat increasing step according to the second heartbeat time and the previous heartbeat time after receiving the feedback from the server of the long connection;

In the exemplary embodiment, when the client of the long connection has not received the feedback from the server of the long connection for the previous heartbeat time, the heartbeat time is initialized again. When the client of the long connection receives the feedback from the server of the long connection for the previous heartbeat time, the original heartbeat increasing step is calculated according to the formula $B_0=(f(n)-f(n-1))/2$. And, $n \geq 1$, presents for the original heartbeat increasing step, $f(n)$ presents for the second heartbeat time, $f(n-1)$ presents for the previous heartbeat time of the second heartbeat time.

a fourth heartbeat time acquiring module 500, which is used for calculating a third heartbeat time according to the original heartbeat increasing step and the second heartbeat time, calculating a new heartbeat increasing step according to the original heartbeat increasing step, calculating a fourth heartbeat time according to the new heartbeat increasing step and the third heartbeat time, until the fourth heartbeat time reaches a preset limit value or the heartbeat increasing step being zero, the fourth heartbeat time is regarded as the heartbeat time to maintain the survival of the long connection.

After the original heartbeat increasing step $B_0$ is got, a new heartbeat Increasing step is calculated according to formula: $B_n=(B_{n-1})/2$. And, $n \geq 1$, $B_n$ presents for the new heartbeat increasing step, $Bn-1$ presents for the previous heartbeat increasing step of the new heartbeat increasing step. Then the third heartbeat time and the fourth heartbeat time are calculated according to $f'(n)=f'(n-1)+B_0$. After the threshold value are calculated according to the formula, the best value is found quickly. And, $n \geq 1$, when $n=1$, the third heartbeat time is calculated according to the original heartbeat increasing step $B_0$ and the second heartbeat time. Then, the client of the long connection sends the got third heartbeat time to the server of the long connection, and when the client of the long connection receives the feedback of the server of the long connection, n gradually increases by 1 step, the fourth heartbeat time is got according to the formula. When the feedback from the server of the long connection has not been received, go to step S13, the original heartbeat time is sent to the server of the long connection for trying. Then the client of the long connection sends the fourth heartbeat time to the server of the long connection, and when the client of the long connection receives the feedback from the server of the long connection for the fourth heartbeat time, n gradually increases, the fourth heartbeat time is continuously calculated, until the fourth heartbeat time reaches a preset limit value or the heartbeat increasing step is zero, the fourth heartbeat time is regarded as the heartbeat time to maintain the survival of the long connection.

Accordingly, the present disclosure a terminal, the terminal includes the above device for acquiring a heartbeat time of a long connection, that is, the terminal includes the original heartbeat time acquiring module 100, the second heartbeat time acquiring module 200, the sending module 300, the original heartbeat increasing step acquiring module 400, and the fourth heartbeat time acquiring module 500, the terminal. The terminal can be a phone, a computer, a smart television, and so on.

The embodiments above are preferably embodiments of the present disclosure, and the present disclosure is not limited to such embodiments, equivalent structure conversion based on the specification and the drawing of the present disclosure, or directly or indirectly used in other related technical field, both similarly within the protection scope of the present disclosure.

I claim:

1. A method for acquiring a heartbeat time of a long connection, comprising the following steps:
confirming an original heartbeat time according a current network environment;
calculating a first heartbeat time according to the original heartbeat time, and sending the first heartbeat time to the server of the long connection, when receiving a feedback from the server of the long connection, regarding the first heartbeat time as a new original heartbeat time which being used for calculating a second heart beat time, sending the second heartbeat time to the server of the long connection, until no feedback from the server of the long connection being received;

sending the original heartbeat time to the server of the long connection when the feedback from the server of the long connection being not received, sending a previous heartbeat time of the second heartbeat time to the server of the long connection when receiving the feedback from the server of the long connection corresponding the original heartbeat time;

after receiving the feedback from the server of the long connection, calculating an original heartbeat increasing step according to the second heartbeat time and the previous heartbeat time;

calculating a third heartbeat time according to the original heartbeat increasing step and the second heartbeat time, calculating a new heartbeat increasing step according to the original heartbeat increasing step, calculating a fourth heartbeat time according to the new heartbeat increasing step and the third heartbeat time, until the fourth heartbeat time reaching a preset limit value or the heartbeat increasing step being zero, regarding the fourth heartbeat time as the heartbeat time to maintain the survival of the long connection.

2. The method for acquiring a heartbeat time of a long connection according to claim 1, wherein the formula of calculating the heartbeat time is:

$$f(n)2*f(n-1);$$

and, n≥1, the original heartbeat time f(0) is 10~20 seconds; when n=1, the first heartbeat time is f(1)=2*f(0); when n is increasing, the second heartbeat time is got; n is the number of times that the heartbeat is calculated, f(n) is the nth calculated heartbeat time.

3. The method for acquiring a heartbeat time of a long connection according to claim 2, wherein the formula of calculating the original heartbeat increasing step is:

B0=(f(n)−f(n−1))/2; and n≥1, B0 presents for the original heartbeat increasing step, f(n) presents for the second heartbeat time, f(n−1) presents for the previous heartbeat time of the second heartbeat time;

the new heartbeat increasing step is calculated according to a following formula: Bn=(Bn−1)/2; and n≥1, Bn presents for the new heartbeat increasing step, Bn−1 presents for the previous heartbeat increasing step of the new heartbeat increasing step;

the third heartbeat time and the fourth heartbeat time are calculated according to a following formula:

f'(n)=f'(n−1)+Bn); and, n≥1, when n=1, the third heartbeat time u ted;

when n increases, the fourth heartbeat time is got.

4. The method for acquiring a heartbeat time of a long connection according to claim 1, wherein calculating the first heartbeat time according, to the original heartbeat time, and sending the first heartbeat time to the server of the long connection, when receiving a feedback from the server of the long connection, regarding the first heartbeat time as a new original heartbeat time which is used for calculating a second heart beat time, sending the second heartbeat time to the server of the long connection until no feedback from the server of the long connection is received comprises:

when a preset number of sending the first heartbeat time or the second heartbeat time to the server of the long connection is not met another preset number of the feedback from the server of the long connection, no feedback from the server of the long connection is received is confirmed.

5. The method for acquiring a heartbeat time of a long connection according to claim 3, wherein calculating the first heartbeat time according to the original heartbeat time, and sending the first heartbeat time to the server of the long connection, when receiving a feedback from the server of the long connection, regarding the first heartbeat time as a new original heartbeat time which is used for calculating a second heart beat time, sending the second heartbeat time to the server of the long connection until no feedback from the server of the long connection is received comprises:

when a preset number of sending the first heartbeat time or the second heartbeat time to the server of the long connection is not met another preset number of the feedback from the server of the long connection, no feedback from the server of the long connection is received is confirmed.

6. A device for acquiring a heartbeat time of a long connection, comprising a processor and a non-transitory memory coupled to the processor, the non-transitory memory storing programmed instruction units executable by the processor and comprising:

an original heartbeat time acquiring module, which being used for confirming an original heartbeat time according a current network environment;

an second heartbeat time acquiring module, which being used for calculating a first heartbeat time according to the original heartbeat time, and sending the first heartbeat time to the server of the long connection, when receiving a feedback from the server of the long connection, regarding the first heartbeat time as a new original heartbeat time which being used for calculating a second heart beat time, sending the second heartbeat time to the server of the long connection, until no feedback from the server of the long connection being received;

a sending module, which being used for sending the original heartbeat time to the server of the long connection when the feedback from the server of the long connection being not received, sending a previous heartbeat time of the second heartbeat time to the server of the long connection when receiving the feedback from the server of the long connection corresponding the original heartbeat time;

an original heartbeat increasing step acquiring module, which being used for calculating an original heartbeat increasing step according to the second heartbeat time and the previous heartbeat time after receiving the feedback from the server of the long connection;

a fourth heartbeat time acquiring module, which being used for calculating a third heartbeat time according to the original heartbeat increasing step and the second heartbeat time, calculating a new heartbeat increasing step according to the original heartbeat increasing step, calculating a fourth heartbeat time according to the new heartbeat increasing step and the third heartbeat time, until the fourth heartbeat time reaching a preset limit value or the heartbeat, increasing step being zero, regarding the fourth heartbeat time as the heartbeat time to maintain the survival of the long connection.

7. The device for acquiring a heartbeat time of a long connection according to claim 6, wherein the formula of calculating the heartbeat time is:

$$f(n)=2*f(n-1);$$

and, the original heartbeat time f(0) is 10~20 seconds; when n=1, the first heartbeat time is f(1)=2*f(0); when n is increasing, the second heartbeat time is got; n is the number of times that the heartbeat is calculated, f(n) is the nth calculated heartbeat time.

8. The device for acquiring a heartbeat time of a long connection according to claim 7, wherein the formula of calculating the original heartbeat increasing step is:

B0=(f(n)−f(n−1))/2; and N≥1, B0 presents for the original heartbeat increasing step, f(n) presents for the second heartbeat tune, f(n−1) presents for the previous heartbeat time of the second heartbeat time;

the new heartbeat increasing step is calculated according to a following, formula: Bn=(Bn−1)/2; and n≥1; n=1, presents for the new heartbeat increasing step, Bn−1 presents for the previous heartbeat increasing step of the new heartbeat increasing step;

the third heartbeat time and the fourth heartbeat time are calculated according to a following formula:

f'(n)=f'(n−1)+Bn; and, n≥1, when n=1, the third heartbeat time calculated; when n increases, the fourth heartbeat time is got.

9. The device for acquiring a heartbeat time of a long connection according to claim 6, wherein the second heartbeat time acquiring module is also used for confirming that no feedback from the server of the long connection is received, when a preset number of sending the first heartbeat time or the second heartbeat time to the server of the long connection is not met another preset number of the feedback from the server of the long connection.

10. The device for acquiring a heartbeat time of a long connection according to claim 8, wherein the second heartbeat time acquiring module is also used for confirming that no feedback from the server of the long connection is received, when a preset number of sending the first heartbeat time or the second heartbeat time to the server of the long connection is not met another preset number of the feedback from the server of the long connection.

11. A terminal, comprising a device for acquiring a heartbeat time of a long connection, the device for acquiring the heartbeat time of the long connection comprising a processor and a non-transitory memory coupled to the processor, the non-transitory memory storing programmed instruction units executable by the processor and comprising:

an original heartbeat time acquiring module, which being used for confirming an original heartbeat time according a current network environment;

an second heartbeat time acquiring module, which being used for calculating a first heartbeat time according to the original heartbeat time, and sending the first heartbeat time to the server of the long connection, when receiving a feedback from the server of the long connection, regarding the first heartbeat time as a new original heartbeat time which being used for calculating a second heart beat time, sending the second heartbeat time to the server of the long connection, until no feedback from the server of the long connection being received;

a sending module, which being used for sending the original heartbeat time to the server of the long connection when the feedback from the server of the long connection being not received, sending a previous heartbeat time of the second heartbeat time to the server of the long connection when receiving the feedback from the server of the long connection corresponding the original heartbeat time;

an original heartbeat increasing step acquiring module, which being used for calculating an original heartbeat increasing step according to the second heartbeat time and the previous heartbeat time after receiving the feedback from the server of the long connection;

a fourth heartbeat time acquiring module, which being used for calculating a third heartbeat time according to the original heartbeat increasing step and the second heartbeat time, calculating a new heartbeat increasing step according to the original heartbeat increasing step, calculating a fourth heartbeat time according to the new heartbeat increasing step and the third heartbeat time, until the fourth heartbeat time reaching a preset limit value or the heartbeat increasing step being zero, regarding the fourth heartbeat time as the heartbeat time to maintain the survival of the long connection.

* * * * *